US012638834B2

(12) United States Patent     (10) Patent No.:     US 12,638,834 B2
Kadena et al.                      (45) Date of Patent:     May 26, 2026

(54) MANUFACTURING CONDITION OPTIMIZATION APPARATUS, COMPUTER PROGRAM PRODUCT, AND MANUFACTURING CONDITION OPTIMIZATION METHOD

(71) Applicant: KONICA MINOLTA, INC., Tokyo (JP)

(72) Inventors: Kenichi Kadena, Toyokawa (JP); Ryuji Kamata, Hachioji (JP); Isamu Hisamitsu, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 357 days.

(21) Appl. No.: 18/261,314

(22) PCT Filed: Oct. 25, 2021

(86) PCT No.: PCT/JP2021/039329
§ 371 (c)(1),
(2) Date: Jul. 13, 2023

(87) PCT Pub. No.: WO2022/158066
PCT Pub. Date: Jul. 28, 2022

(65) Prior Publication Data
US 2024/0077854 A1     Mar. 7, 2024

(30) Foreign Application Priority Data
Jan. 19, 2021     (JP) ................................. 2021-006500

(51) Int. Cl.
*G05B 19/418*     (2006.01)
(52) U.S. Cl.
CPC .................. *G05B 19/41865* (2013.01); *G05B 2219/31372* (2013.01)

(58) Field of Classification Search
None
See application file for complete search history.

(56) References Cited

U.S. PATENT DOCUMENTS

| | | | | |
|---|---|---|---|---|
| 5,740,065 A | * | 4/1998 | Jang | G03F 7/70633 |
| | | | | 700/121 |
| 6,449,749 B1 | * | 9/2002 | Stine | H01L 22/20 |
| | | | | 716/56 |

(Continued)

FOREIGN PATENT DOCUMENTS

| | | |
|---|---|---|
| JP | H08305763 A | 11/1996 |
| JP | 2012074007 A | 4/2012 |

(Continued)

OTHER PUBLICATIONS

International Search Report (PCT/ISA/210) with translation and Written Opinion (PCT/ISA/237) mailed on Dec. 21, 2021, by the Japanese Patent Office as the International Searching Authority for International Application No. PCT/JP2021/039329. (8 pages).

(Continued)

*Primary Examiner* — Jason Lin
(74) *Attorney, Agent, or Firm* — Buchanan Ingersoll & Rooney PC

(57)     ABSTRACT

A manufacturing condition optimization apparatus includes a yield estimator for estimating a yield of a product having a quality that passes inspection by inspection equipment when a manufacturing condition of the product that is manufactured by manufacturing equipment is changed and an optimization processor for calculating an amount of change in the manufacturing condition at which the yield is maximized.

10 Claims, 5 Drawing Sheets

(56) References Cited

U.S. PATENT DOCUMENTS

| | | | | |
|---|---|---|---|---|
| 6,470,229 | B1 * | 10/2002 | Wang | H01L 22/20 |
| | | | | 700/121 |
| 6,751,519 | B1 * | 6/2004 | Satya | H01L 22/34 |
| | | | | 702/182 |
| 6,799,311 | B1 * | 9/2004 | Ryskoski | G01R 31/01 |
| | | | | 700/110 |
| 6,834,375 | B1 * | 12/2004 | Stine | H01L 22/20 |
| | | | | 716/136 |
| 6,947,803 | B1 * | 9/2005 | Bode | H01L 21/67253 |
| | | | | 700/109 |
| 7,308,669 | B2 * | 12/2007 | Buehler | G06F 30/39 |
| | | | | 716/112 |
| 10,515,725 | B2 * | 12/2019 | Lin | G16H 40/63 |
| 10,783,290 | B2 * | 9/2020 | Ma | G05B 19/41875 |
| 2003/0182252 | A1 * | 9/2003 | Beinglass | H01L 22/20 |
| | | | | 706/45 |
| 2006/0036345 | A1 * | 2/2006 | Cao | G05B 13/027 |
| | | | | 702/182 |
| 2009/0228129 | A1 * | 9/2009 | Moyne | G06Q 10/06 |
| | | | | 706/47 |
| 2009/0297019 | A1 * | 12/2009 | Zafar | G06F 30/398 |
| | | | | 382/145 |
| 2009/0317924 | A1 * | 12/2009 | Ouyang | H01L 21/67276 |
| | | | | 707/999.107 |
| 2011/0213489 | A1 * | 9/2011 | Lacaille | G06N 5/043 |
| | | | | 700/109 |
| 2018/0150038 | A1 * | 5/2018 | Lin | G05B 13/041 |
| 2020/0110389 | A1 * | 4/2020 | Borowicz | B64F 5/00 |
| 2020/0159197 | A1 | 5/2020 | Horiwaki et al. | |

FOREIGN PATENT DOCUMENTS

| | | | | |
|---|---|---|---|---|
| JP | 2012226511 | A | * | 11/2012 |
| JP | 2020086784 | A | | 6/2020 |
| JP | 2020087110 | A | | 6/2020 |
| JP | 2020166749 | A | * | 10/2020 |

OTHER PUBLICATIONS

Office Action (Notice of Reasons for Refusal) issued on Dec. 10, 2024, by the Japanese Patent Office in corresponding Japanese Patent Application No. 2022-576979, and an English Translation of the Office Action. (8 pages).

* cited by examiner

| MANUFACTURING CONDITION CHANGE AMOUNT | QUALITY CHANGE AMOUNT |
|---|---|
| (#,#,...) | (#,#,...), (#,#,...), ... |
| (#,#,...) | (#,#,...), (#,#,...), ... |
| . . . | . . . |

| PRODUCT ID | DATE & TIME OF MANUFACTURE | MANUFACTURING CONDITION | QUALITY | INSPECTION RESULT |
|---|---|---|---|---|
| 394857 | 20201113-124349 | (#,#,...) | (#,#,...) | OK |
| 394858 | 20201113-124350 | (#,#,...) | (#,#,...) | NG |
| . . . | . . . | . . . | . . . | . . . |

START

OBTAIN MANUFACTURING MANAGEMENT DATA — S11

GENERATE LEARNING DATA — S12

GENERATE REGRESSION MODEL — S13

END

MANUFACTURING CONDITION OPTIMIZATION APPARATUS, COMPUTER PROGRAM PRODUCT, AND MANUFACTURING CONDITION OPTIMIZATION METHOD

TECHNICAL FIELD

The invention relates to a manufacturing condition optimization apparatus, a program, and a manufacturing condition optimization method for optimizing a manufacturing condition of manufacturing equipment.

BACKGROUND ART

In the case of manufacturing a product and shipping a product that has passed a quality inspection, yield of the product (an inspection pass rate) is important and serves as a manufacturing index.

An operation condition optimization system for a plant disclosed in Patent Literature 1 includes an operation state data acquisition means for acquiring operation state data indicating an operation state of a plant measured by a plurality of sensors. The operation condition optimization system includes an operation index data acquisition means for acquiring operation index data for evaluating the operation of the plant, the operation index data being measured by a sensor provided in the plant or being determined based on the operation state data acquired by the operation state data acquisition means. The operation condition optimization system includes a measurement data recording means for associating the operation state data acquired by the operation state data acquisition means with the operation index data obtained by the operation index data acquisition means on the basis of a predetermined item to form a set of measurement data and recording the measurement data in a data recording part. The operation condition optimization system includes a regression model creating means for creating a regression model by performing a predetermined multivariate analysis using an operation state variable representing the operation state data side as explanatory variables and an operation index variable representing the operation index data side as an objective variable on the basis of the plurality of sets of measurement data recorded in the data recording part. The regression model includes: a component conversion means for converting the explanatory variables into components that are mutually uncorrelated and smaller in number than the number of the original explanatory variables; a prediction means for predicting an objective variable from the components converted by the component conversion means; and an inverse conversion means for estimating the explanatory variables from the components by a method corresponding to the component conversion means. The operation condition optimization system includes an operation index variable optimization means for determining an operation state variable that optimizes an operation index variable based on the regression model created by the regression model creating means. The operation index variable optimization means calculates explanatory variable values for optimizing an evaluation function related to the objective variable predicted by the prediction means while satisfying a constraint condition related to the explanatory variables estimated by the inverse conversion means, and takes the explanatory variable values as an optimum operation condition.

CITATION LIST

Patent Literature

Patent Literature 1: Japanese Unexamined Patent Application Publication No. 2012-074007

SUMMARY

Technical Problem

The quality of a product depends on a manufacturing condition of the product. Even if an appropriate manufacturing condition is once set, disturbances that are difficult to completely control, such as temperature and material viscosity, may cause a change in quality and a product yield decrease. The same applies to a disturbance that is not a target to be measured or monitored in the manufacturing environment. Therefore, it is required to adjust the manufacturing condition in real time during the manufacturing of the product. However, with the operation condition optimization system described in Patent Document 1, it is not assumed that the manufacturing condition will be adjusted in real time in anticipation of a change due to disturbance. Therefore, it is not possible to perform optimization corresponding to an uncontrollable change in disturbance.

The present invention has been made in consideration of such a background, and an object of the present invention is to provide a manufacturing condition optimization apparatus, a program, and a manufacturing condition optimization method that make it possible to improve a manufacturing index by adjusting a manufacturing condition of a product even in a case where there is a disturbance.

Solution to Problem

The above object of the present invention is achieved by the following means.

(1) A manufacturing condition optimization apparatus including: a yield estimator configured to estimate a yield of a product having a quality that passes inspection by inspection equipment when a manufacturing condition of the product that is manufactured by manufacturing equipment is changed; and an optimization processor configured to calculate an amount of change in the manufacturing condition at which the yield is maximized.

(2) The manufacturing condition optimization apparatus according to (1) further including: a quality change amount estimator configured to estimate an amount of change in a quality of the product that is manufactured by the manufacturing equipment from an amount of change in the manufacturing condition, in which the yield estimator is configured to: estimate a probability that the product passes inspection by the inspection equipment from the amount of change in the quality of the product that is estimated by the quality change amount estimator; and estimate the yield of the product having a quality that passes inspection by the inspection equipment from the probability that the product passes inspection.

(3) The manufacturing condition optimization apparatus according to (2) further including: a regression model generator, in which the regression model generator is configured to generate a regression model for estimating an amount of change in the quality of the product from an amount of change in the manufacturing condition based on data that associates an amount of change in the manufacturing condition of a past and an amount of change in the quality of the product for said amount of change in the manufacturing condition, and the quality change amount estimator is configured to estimate an amount of change in the quality of the product from an amount of change in the manufacturing condition using the regression model.

(4) The manufacturing condition optimization apparatus according to (3), in which the regression model is a generalized linear model, a Gaussian process regression model, or a neural network model.

(5) The manufacturing condition optimization apparatus according to (1), in which the optimization processor is configured to calculate the amount of change in the manufacturing condition at which the yield is maximized by using at least one of an optimization algorithm that does not use a derivative, a local search method, simulated annealing, tabu search, or a genetic algorithm.

(6) The manufacturing condition optimization apparatus according to (2), in which when the yield estimator estimates the probability that the product passes inspection by the inspection equipment from the amount of change in the quality, the probability that the product passes inspection by the inspection equipment is estimated based on the quality of a predetermined number of products that have been manufactured most recently.

(7) The manufacturing condition optimization apparatus according to (2), in which the yield estimator is configured to: obtain, from an amount of change in the quality of the product, a probability distribution of the quality of said product; and estimate the probability that said product passes inspection by the inspection equipment based on the probability distribution.

(8) The manufacturing condition optimization apparatus according to (7), in which the probability distribution is a normal distribution, a binomial distribution, or a Poisson distribution.

(9) A program for causing a computer to function as a manufacturing condition optimization apparatus according to any one of (1) to (8).

(10) A manufacturing condition optimization method for a manufacturing condition optimization apparatus, the method including: estimating a yield of a product having a quality that passes inspection by inspection equipment when a manufacturing condition of the product that is manufactured by manufacturing equipment is changed; and calculating an amount of change in the manufacturing condition at which the yield is maximized.

Advantageous Effects of Invention

According to the present invention, it is possible to provide a manufacturing condition optimization apparatus, a program, and a manufacturing condition optimization method that enable improvement of a manufacturing index by adjusting a manufacturing condition of a product even in a case where there is a disturbance.

DESCRIPTION OF EMBODIMENTS

Overall Configuration of Manufacturing System

Hereinafter, a manufacturing condition optimization apparatus according to an embodiment of the invention will be described.

Figure 1:
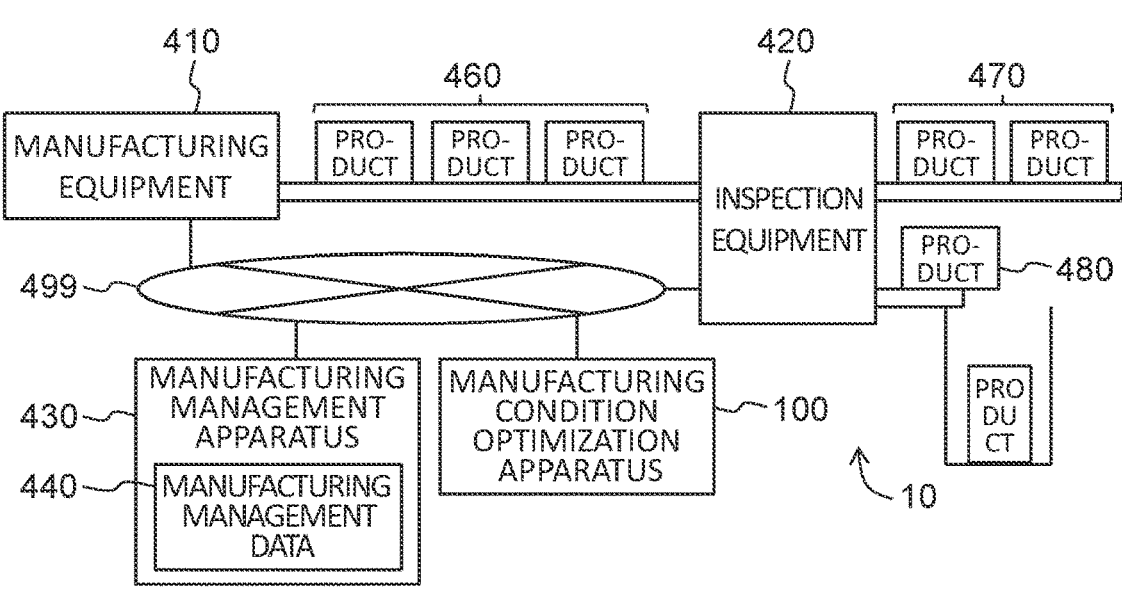
FIG. 1 shows a schematic block diagram of a manufacturing system according to an embodiment of the invention.

FIG. 1 shows a schematic block diagram of a manufacturing system 10 according to an embodiment. The manufacturing system 10 is configured to include manufacturing equipment 410, inspection equipment 420, a manufacturing management apparatus 430, and a manufacturing condition optimization apparatus 100. The manufacturing equipment 410, inspection equipment 420, manufacturing management apparatus 430, and manufacturing condition optimization apparatus 100 can communicate with each other via a network 499.

The manufacturing equipment 410 manufactures a product 460 under a manufacturing condition set by the manufacturing management apparatus 430. The manufacturing equipment 410 transmits the manufacturing condition of individual products 460 to the manufacturing management apparatus 430.

The product 460 is conveyed to inspection equipment 420 and is inspected. A product 470 that passes the inspection is shipped as a good product. A product 480 that fails the inspection is a defective product and is discarded.

The inspection equipment 420 measures one or more qualities (quality items, inspection items) of each product 460. When all of one or more measured values of a product 460 are each within a corresponding reference range (between an upper limit value and a lower limit value), the inspection equipment 420 considers that product 460 to have passed the inspection. The inspection equipment 420 transmits the measured value of quality (also simply referred to as a quality or a quality value) of each of the products 460 to the manufacturing management apparatus 430.

The manufacturing management apparatus 430 stores therein manufacturing management data 440 (see FIG. 5 to be described later) that stores the manufacturing condition and quality of each product 460.

Based on the manufacturing management data 440, the manufacturing condition optimization apparatus 100 obtains a manufacturing condition that will maximize a yield of the product 460. Thus, the manufacturing index can be improved.

Outline of Manufacturing Condition Optimization Apparatus

Figure 2:
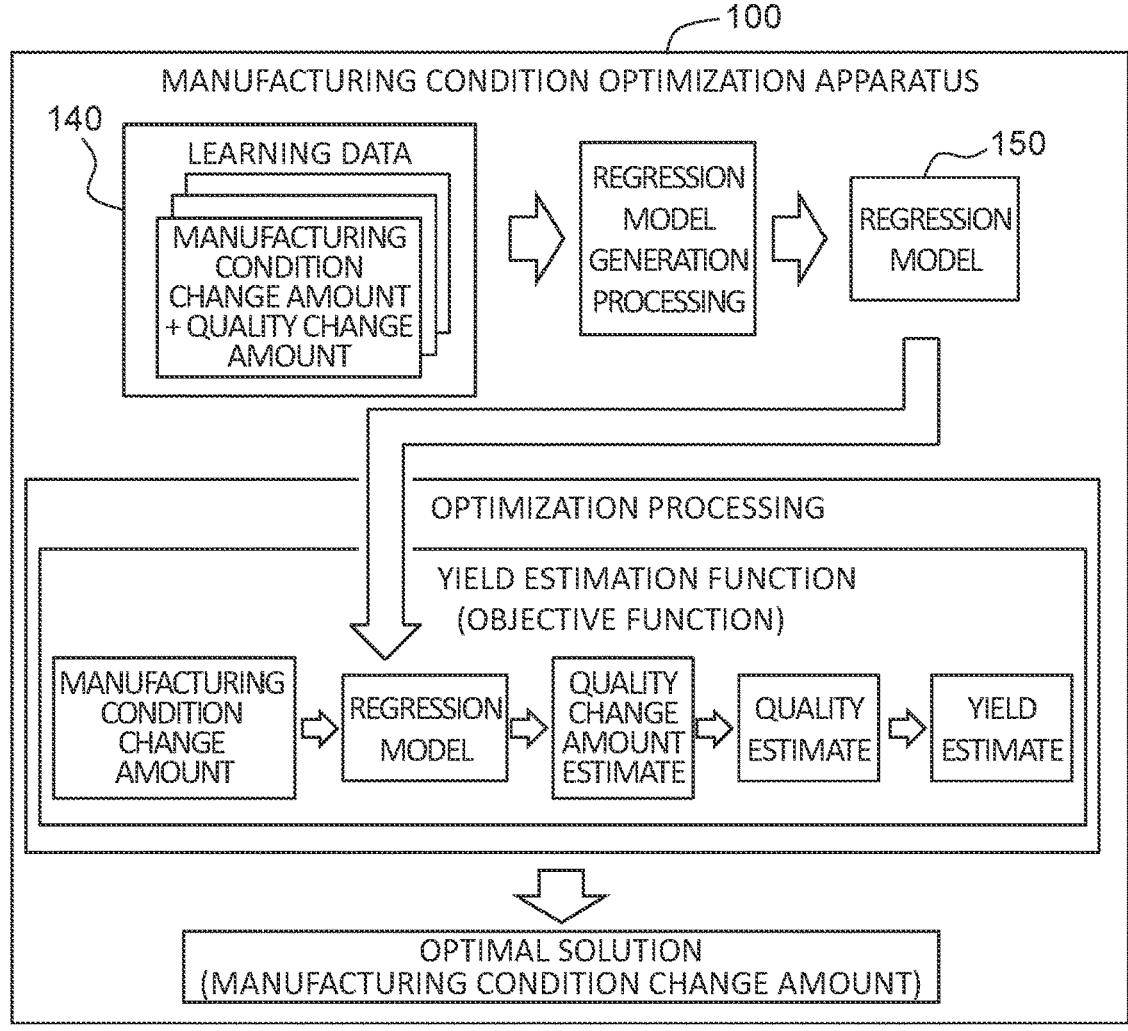
FIG. 2 is a diagram for explaining the outline of a process of a manufacturing condition optimization apparatus according to an embodiment.

FIG. 2 is a diagram for explaining an outline of processing performed by the manufacturing condition optimization apparatus 100 according to the present embodiment. In the regression model generation processing, a regression model 150 is generated from learning data 140. The learning data 140 is data in which two amounts of change form a set. One is an amount of change in the manufacturing condition of the manufacturing equipment 410 (see FIG. 1). The other is an amount of change in the quality of the product 460 at the inspection equipment 420 when the manufacturing condition is changed by said amount of change in the manufacturing condition. The regression model 150 is a model for estimating an amount of change in the quality of the product 460 (quality change amount) from an amount of change in the manufacturing condition (manufacturing condition change amount), and is, for example, a linear regression model.

In optimization processing, the manufacturing condition optimization apparatus 100 solves an optimization problem that maximizes a yield of the product 460 by using a manufacturing condition change amount as an input (variable) and using a yield estimation function for estimating the yield as an objective function. The yield estimation function estimates the yield by calculating an estimated value of the quality change amount from the manufacturing condition change amount, which is input, using the regression model 150 and obtaining an estimated value of quality from the quality change amount. The solution to this optimization problem is an amount of change in the manufacturing condition that maximizes the yield. The manufacturing condition optimization apparatus 100 transmits this manufacturing condition change amount to the manufacturing management apparatus 430. The manufacturing management apparatus 430 can maximize the yield of the product 460 by setting the manufacturing condition of the manufacturing equipment 410 according to the manufacturing condition change amount.

Configuration of Manufacturing Condition Optimization Apparatus

Figure 3:
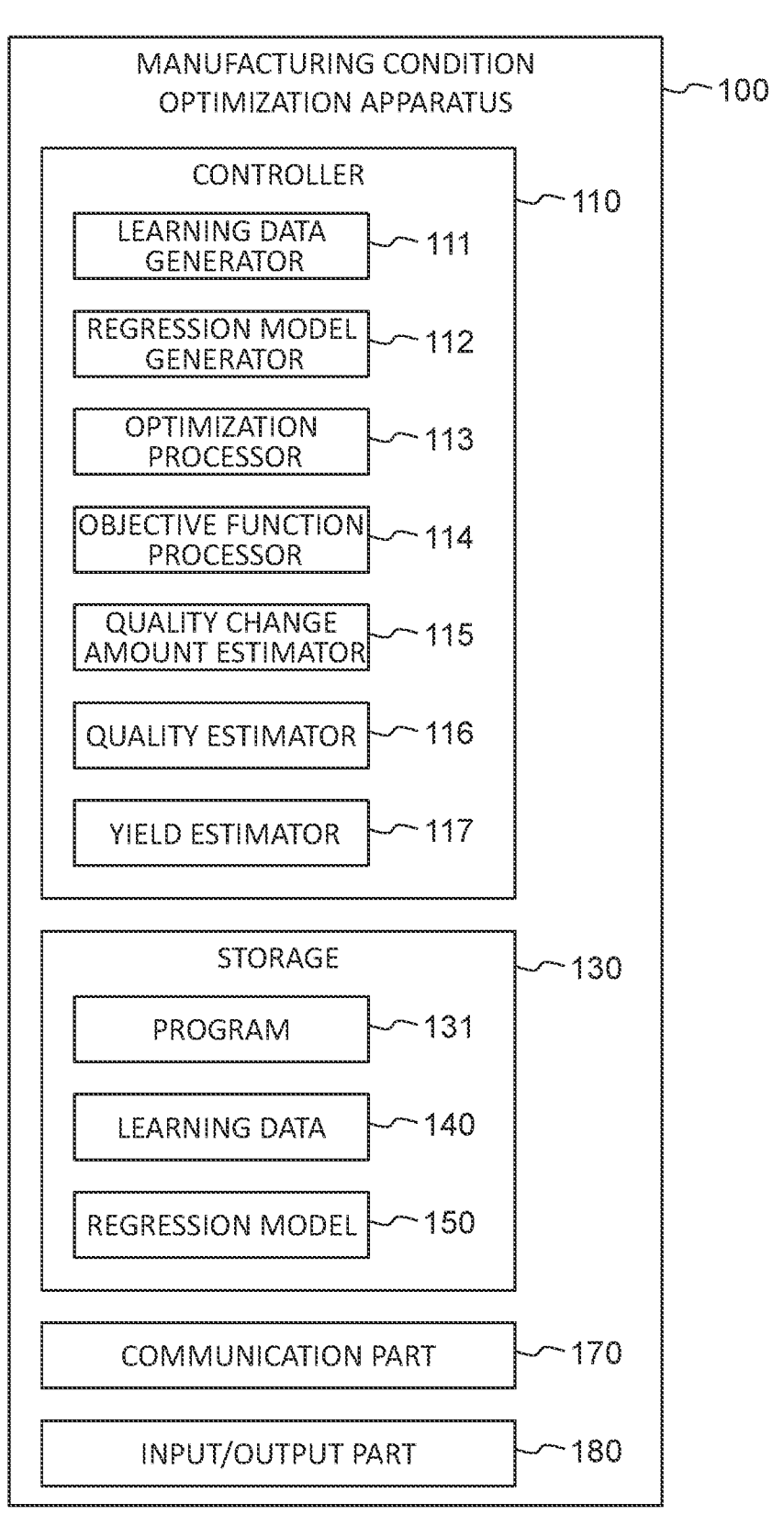
FIG. 3 is a functional block diagram of a manufacturing condition optimization apparatus according to an embodiment.

FIG. 3 is a functional block diagram of the manufacturing condition optimization apparatus 100 according to the present embodiment. The manufacturing condition optimization apparatus 100 is configured to include a controller 110, storage 130, a communication part 170, and an input/output part 180. The communication part 170 transmits and receives communication data to and from other devices including the manufacturing management apparatus 430. A user interface device such as a display, a keyboard, or a mouse is connected to the input/output part 180.

The storage 130 is configured to include a read only memory (ROM), a random access memory (RAM), a solid state drive (SSD), or the like. The storage 130 stores a program 131, learning data 140 (see FIG. 4 described later), and a regression model 150. In the program 131, procedures of regression model generation processing (see FIG. 6 to be described later), optimization processing, and processing of an objective function (yield estimation function) (see FIG. 7 to be described later) are described.

Figure 4:
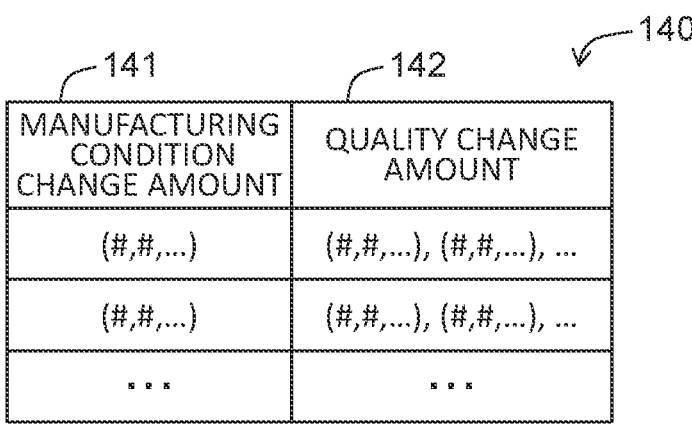
FIG. 4 is a data configuration diagram of learning data according to an embodiment.

Configuration of Manufacturing Condition Optimization Apparatus: Learning Data FIG. 4 is a data configuration diagram of the learning data 140 according to the present embodiment. The learning data 140 is, for example, tabular data, and one row (a record) includes columns (attributes) for a manufacturing condition change amount 141 and a quality change amount 142.

The manufacturing condition change amount 141 indicates an amount of change in a case where the manufacturing condition of the manufacturing equipment 410 is changed. The manufacturing condition includes one or more items, and the manufacturing condition change amount 141 indicates an amount of change of one or more items.

The quality change amount 142 indicates a quality change amount of a product 460, which has been measured by the inspection equipment 420, when the manufacturing condition is changed by the amount indicated by the manufacturing condition change amount 141. The quality change amount 142 includes one or more amounts of change in quality (a measured value from inspection, a quality value) for one or more products 460.

Configuration of Manufacturing Condition Optimization Apparatus: Controller

Returning to FIG. 3, the description of the manufacturing condition optimization apparatus 100 is continued. The controller 110 is configured to include a central processing unit (CPU), and includes a learning data generator 111, a regression model generator 112, an optimization processor 113, an objective function processor 114, a quality change amount estimator 115, a quality estimator 116, and a yield estimator 117.

The learning data generator 111 obtains manufacturing management data 440 (see FIG. 5 described later) stored in the manufacturing management apparatus 430 and generates the learning data 140 (see FIG. 4).

Figure 5:
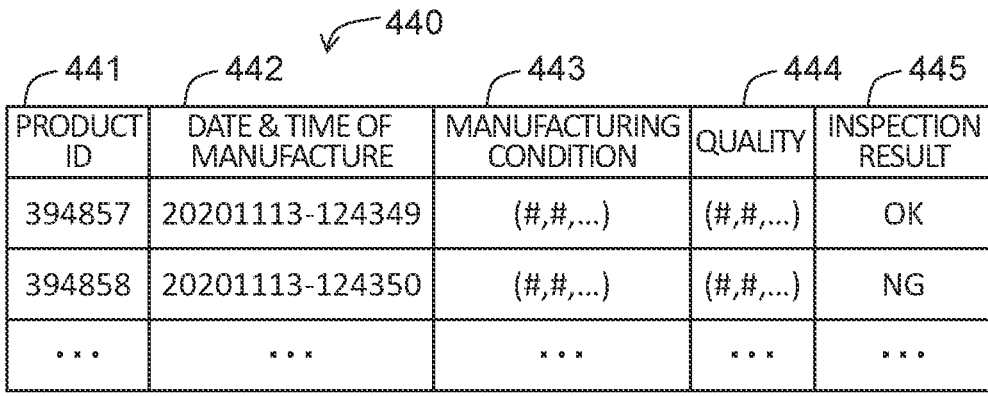
FIG. 5 is a data configuration diagram of manufacturing management data according to an embodiment.

FIG. 5 is a data configuration diagram of the manufacturing management data 440 according to the present embodiment. The manufacturing management data 440 is, for example, data in a table format, and one row (a record) includes columns (attributes) for product identification information 441 (described as a product identifier (ID) in FIG. 5), a manufacturing date and time 442, a manufacturing condition 443, a quality 444, and an inspection result 445.

The product identification information 441 is information for identifying each product 460, and is, for example, a serial number. The manufacturing date and time 442 is a date and time when a product 460 has been manufactured. The manufacturing condition 443 is a manufacturing condition of the manufacturing equipment 410 when the product 460 is manufactured. The quality 444 is a measured value from inspection of the product 460 by the inspection equipment 420. The inspection result 445 indicates whether a product has passed or failed (OK/NG) the inspection.

Returning to FIG. 3, the description of the controller 110 is continued. The learning data generator 111 acquires the manufacturing management data 440 and divides the products into groups of products that have been manufactured consecutively and have the same manufacturing condition 443. Next, for each group, the learning data generator 111 obtains an amount of change in the manufacturing condition 443 from a previous group and sets the amount of change as the manufacturing condition change amount. Subsequently, for each group, the learning data generator 111 calculates a difference between the quality 444 of each product in the group and the average value of the quality 444 in the previous group, and sets the difference as the quality change amount. The learning data generator 111 adds a record to the learning data 140 (see FIG. 4), and sets the manufacturing condition change amount and quality change amount that have been obtained as the manufacturing condition change amount 141 and the quality change amount 142.

The regression model generator 112 generates a regression model 150 based on the learning data 140. The learning data 140 is data indicating an amount of change (quality change amount 142) in the quality of the product in a case where the manufacturing condition is changed by a manufacturing condition change amount 141. The regression model 150 is a model that is referred to when estimating (calculating) a quality change amount from a manufacturing condition change amount and is, for example, a linear regression model. The regression model 150 is calculated asp represented by the following Expression (1).

[EXPRESSION 1]

$$\beta = \left(\Delta X^T \Delta X\right)^{-1} \Delta X^T \Delta y \tag{1}$$

X is a matrix indicating the manufacturing condition that is referenced when the learning data 140 is generated.

$\Delta X$ is a matrix indicating the manufacturing condition change amount included in the learning data 140.

$\Delta X^T$ indicates a transpose of $\Delta X$.

$\Delta y$ is a vector indicating one quality item (measured value from inspection) of the product included in the learning data 140. There are as many $\Delta y$'s as quality items (an N number, which will be described later).

$\beta$ is an estimated value of a partial regression coefficient, and there are as many $\beta$s as quality items.

The optimization processor 113 solves an optimization problem in which a yield score represented by Expression (2) to be described later is maximized by using a yield estimation function described later as an objective function to calculate an amount of change in the manufacturing condition that maximizes yield. An optimization algorithm using no derivative, a local search method, simulated annealing, tabu search, a genetic algorithm, or the like may be used as a method of solving the optimization problem.

[EXPRESSION 2]

$$score = \sum_{j=1}^{M}\sum_{i=1}^{N}\log(P(l_{L,i} \le y_{i,j} \le l_{U,i})) \tag{2}$$

N is a number of qualities (quality items).

i is an index of the quality item, and there are a 1st quality item to an N-th quality item.

M is a number of products for which yield is to be estimated, and is, for example, the number of products manufactured during a predetermined period in the past. The optimization problem in the present embodiment is to obtain a manufacturing condition change amount that maximizes the number of products that pass inspection among M products that are manufactured.

j is an index of M products that are manufactured, and there are a 1st product to an M-th product.

$l_{L,i}$ is a lower limit value of the i-th quality item, and is the lower limit value of the acceptable range of the i-th quality item.

$l_{U,i}$ is an upper limit value of the i-th quality item, and is the upper limit value of the acceptable range of the i-th quality item.

$y_{i,j}$ is a predicted value of the i-th quality item for the j-th product. $y_{i,j}$ follows the probability distribution indicated by the following Expression (3).

[EXPRESSION 3]

$$y_{i,j} \sim N\!\left(\Delta y_i + y_{0,i,j},\, SE(\Delta y_i)^2 + s_i^2\right) \tag{3}$$

N ($\mu$, $\sigma^2$) of Expression (3) represents a normal distribution with an average $\mu$ and a variance $\sigma^2$.

$\Delta y_i$ is an estimated value of an average of the amount of change related to the i-th quality item, and is calculated by Expression (4) described later.

$y_{0,i,j}$ is an actual measured value of the i-th quality item of the j-th product among the M products manufactured most recently.

SE ($\Delta y_i$) is a standard error of an estimated value of the amount of change related to the i-th quality item, and is calculated by Expression (5) to be described later.

$s_i$ is a standard error of regression related to the i-th quality item, and is calculated by Expression (6) described later.

[EXPRESSION 4]

$$\Delta y_i = \Delta x \beta \tag{4}$$

Here, $\Delta x$ in Expression (4) is a vector indicating the amount of change in the manufacturing condition.

$\beta$ is an estimated value of a partial regression coefficient of the learned linear model, and is calculated by Expression (1) described above.

[EXPRESSION 5]

$$SE(\Delta y_i) = s_i \sqrt{\left(\frac{1}{M_0} + \Delta x \left(X^T X\right)^{-1} \Delta x^T\right)} \tag{5}$$

$M_0$ is a number of products when $\beta$ is calculated.

X is a matrix indicating the manufacturing condition that is referenced when the learning data 140 is generated.

$X^T$ indicates a transpose of X.

$\Delta x^T$ indicates a transpose vector of $\Delta x$.

[EXPRESSION 6]

$$s_i = \sqrt{\frac{RSS}{M_0 - K - 1}} \tag{6}$$

K is a number of manufacturing condition.

RSS is a residual sum of squares.

The objective function processor 114 (yield estimation function processor) estimates (calculates) a yield from the manufacturing condition change amount as a yield estimation function which is an objective function. Specifically, the objective function processor 114 obtains a probability distribution of a quality of a product 460 shown in Expression (3) from an amount of change in the quality of the product 460, and estimates the probability that the product 460 passes inspection by the inspection equipment 420 based on the probability distribution. The objective function processor 114 estimates the yield using a quality change amount estimator 115, a quality estimator 116, and a yield estimator 117 described later.

The quality change amount estimator 115 calculates a quality change amount of a product 460 manufactured by the manufacturing equipment 410 from a manufacturing condition change amount of the manufacturing equipment 410 using the regression model 150. Specifically, the quality change amount estimator 115 calculates the estimated value $\Delta y_i$ of the quality change amount from the manufacturing condition change amount $\Delta x$ using Expression (4). Note that $\beta$ in Expression (4) is $\beta$ corresponding to the i-th quality item among N $\beta$(s).

The quality estimator 116 obtains a distribution of $y_{i,j}$ that is a predicted value of the i-th quality item of the j-th product. Specifically, the sum of the estimated value $\Delta y_i$ of the quality change amount and the measured value $y_{0,i,j}$ of the i-th quality item of the j-th product among the M products manufactured most recently is obtained as the average value of the distribution. The variance of the distribution is obtained from the standard error $SE(\Delta y_i)$ of the estimated value $\Delta y_i$ of the quality change amount (see Expression (5)) and the standard error $s_i$ of regression (see Expression (6)). A normal distribution of the obtained average value and variance is set as the distribution of $y_{i,j}$ (see Expression (3)).

The yield estimator 117 obtains a probability P ($l_{L,i} \leq y_{i,j} \leq l_{U,i}$) that the $y_{i,j}$ satisfies the inspection standard from the distribution of $y_{i,j}$, and calculates a yield score (refer to Expression (2)).

As described above, the objective function processor 114 estimates the yield using the quality change amount estimator 115, the quality estimator 116, and the yield estimator 117.

Regression Model Generation Processing

Figure 6:
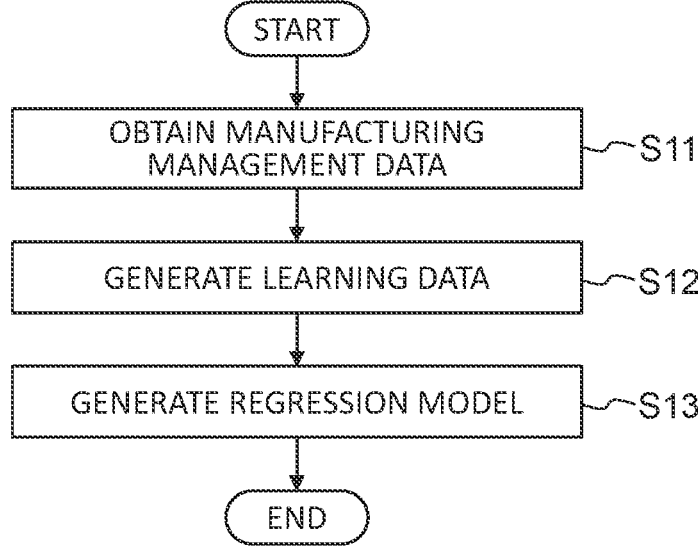
FIG. 6 is a flowchart of a regression model generation processing according to an embodiment.

FIG. 6 is a flowchart of regression model generation processing according to the present embodiment. The regression model generation processing is executed at a predetermined timing such as after finishing inspection of a predetermined number of products after changing the manufacturing condition or at a predetermined cycle.

In step S11, the learning data generator 111 acquires the manufacturing management data 440 (see FIG. 5) from the manufacturing management apparatus 430 (see FIG. 1).

In step S12, the learning data generator 111 generates the learning data 140 (see FIG. 4) from the acquired manufacturing management data 440.

In step S13, the regression model generator 112 generates the regression model 150 (see Expression (1)) from the learning data 140.

Objective Function Processing

Figure 7:
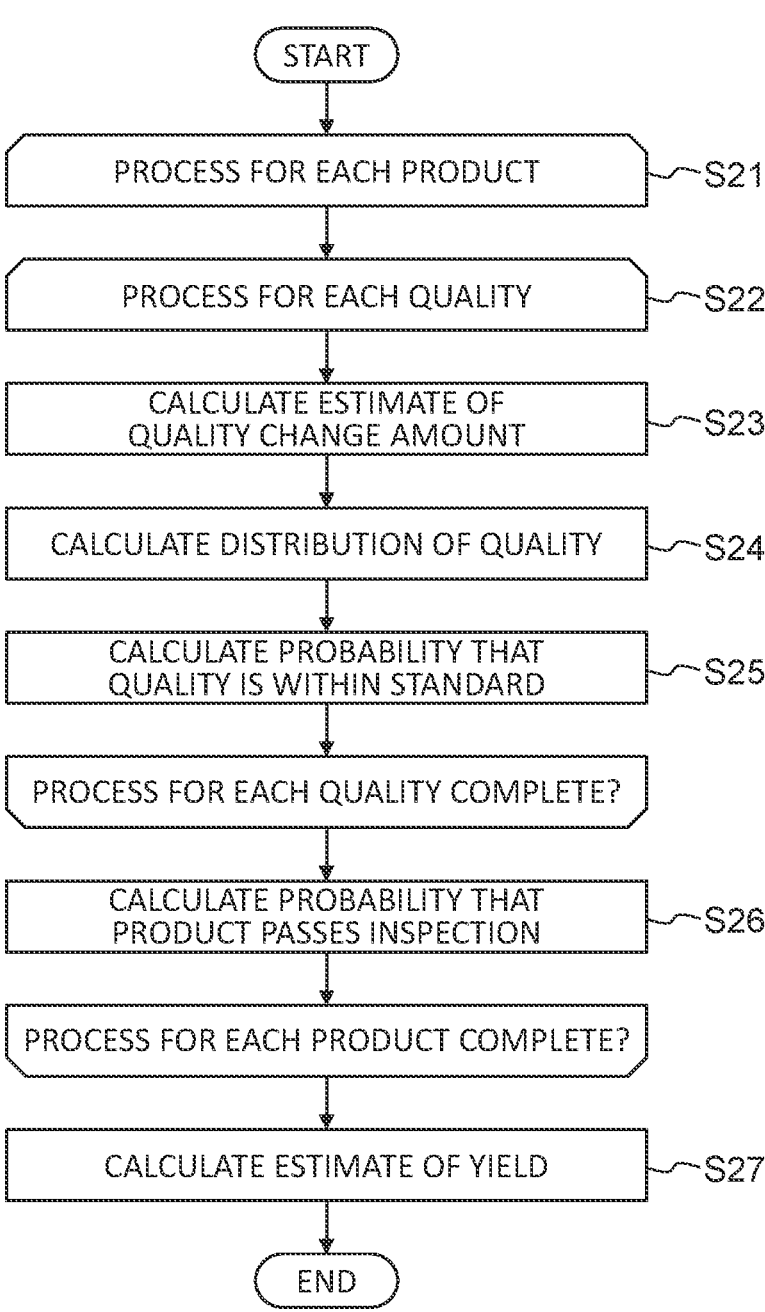
FIG. 7 is a flowchart of an objective function processing executed by an objective function processor according to an embodiment.

FIG. 7 is a flowchart of the objective function processing executed by the objective function processor 114 according to the present embodiment. The objective function processing is called and executed at a necessary timing when the optimization processor 113 solves the optimization problem (see step S31 in FIG. 8 described later).

In step S21, the objective function processor 114 starts a process of repeating steps S22 to S26 for each of M products for which the yield is to be estimated.

In step S22, the objective function processor 114 starts a process of repeating steps S23 to S25 for each of N qualities (quality items).

In step S23, the quality change amount estimator 115 calculates the quality change amount from the manufacturing condition change amount using the regression model

150. Specifically, the quality change amount estimator 115 calculates the estimated value $\Delta y_i$ of the quality change amount from the manufacturing condition change amount $\Delta x$ using Expression (4).

In step S24, the quality estimator 116 obtains the distribution (refer to Expression (3)) of $y_{i,j}$ that is the predicted value of the quality (quality item).

In step S25, the yield estimator 117 obtains a probability P ($l_{L,i} \leq y_{i,j} \leq l_{U,i}$) that the $y_{i,j}$ satisfies the standard of the inspection from the distribution of $y_{i,j}$.

In step S26, the yield estimator 117 obtains a probability $\pi_{i=1, \ldots, N}$ P ($l_{L,i} \leq y_{i,j} \leq l_{U,i}$) of the product passing the inspection. In the present embodiment, instead of $\pi_{i=1, \ldots, N}$ P ($l_{L,i} \leq y_{i,j} \leq l_{U,i}$), $\Sigma_{i=1, \ldots, N}$ log (P ($l_{L,i} \leq y_{i,j} \leq l_{U,i}$)) is obtained.

In step S27, the yield estimator 117 calculates the yield score (refer to Expression (2)).

Optimization Processing

Figure 8:
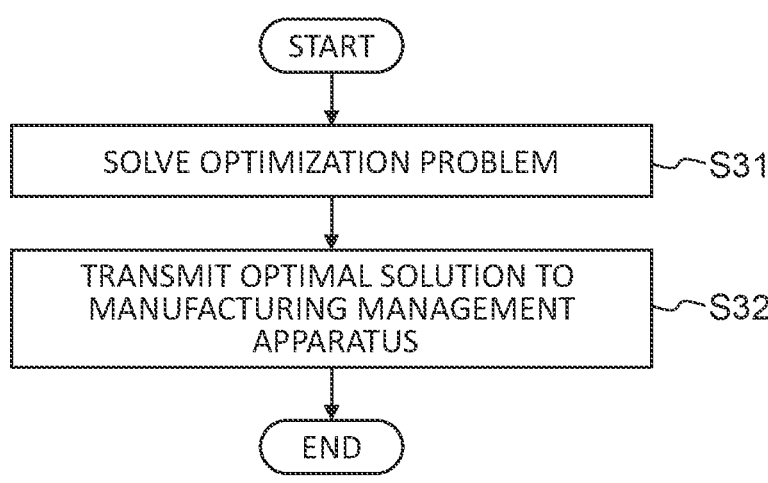
FIG. 8 is a flowchart of optimization processing according to an embodiment.

FIG. 8 is a flowchart of optimization processing according to the present embodiment. The optimization processing is executed at a predetermined timing such as at a predetermined cycle or after manufacturing a predetermined number of products.

In step S31, the optimization processor 113 solves an optimization problem in which the yield score (refer to Expression (2)) is maximized using the yield estimation function as an objective function.

In step S32, the optimization processor 113 transmits the manufacturing condition change amount that is the optimal solution to the manufacturing management apparatus 430. The manufacturing management apparatus 430 that has received the optimal solution instructs the manufacturing equipment 410 to change the manufacturing condition by the manufacturing condition change amount.

Characteristics of Manufacturing Condition Optimization Apparatus

The manufacturing condition optimization apparatus 100 obtains an amount of change of the manufacturing condition (manufacturing condition change amount) at which yield is maximized based on the actual measured value ($y_{0,i,j}$) of the quality of the product manufactured most recently. Specifically, the manufacturing condition optimization apparatus 100 obtains an amount of change of the manufacturing condition that leads to an amount of change of the quality such that the yield is maximized. The manufacturing condition optimization apparatus 100 changes the manufacturing condition on the basis of the quality of the most recently manufactured product with regards to quality caused by disturbance that is not measured or is uncontrollable. The manufacturing condition optimization apparatus 100 is able to set the manufacturing condition so that quality is improved according to the state of the current disturbance that is considered to be the same as or hardly different from the most recent disturbance. As a result, the manufacturing condition optimization apparatus 100 adjusts the manufacturing condition in accordance with the state of the uncontrollable disturbance, and can maximize the yield of the product and improve the manufacturing index.

Modification Example: Regression Model

The regression model 150 in the embodiment described above is a linear regression model but may be another model. For example, a Gaussian process regression model may be used instead of the (generalized) linear model. Alternatively, a machine learning model such as a neural network model may be used. Specifically, a machine learning model for predicting a quality change amount from a manufacturing condition change amount may be generated using the learning data 140 (see FIG. 4) as teacher data and may be used for the yield estimation function (objective function). By using the Gaussian process regression model or the neural network model, it is possible to increase prediction accuracy in a case where there is a high-order interaction between explanatory variables (see the manufacturing condition change amount 141 illustrated in FIG. 4).

In addition to the manufacturing condition change amount 141, a manufacturing condition (refer to the manufacturing condition 443 illustrated in FIG. 5) prior to being converted into a change amount may be added as an explanatory variable in the learning data 140 used for generating the regression model 150. In this case, the regression model 150 is a model for estimating the quality change amount from the manufacturing condition and the amount of change from said manufacturing condition.

Modification Example: Actual Measured Value of Quality

In the above-described embodiment, the manufacturing condition optimization apparatus 100 estimates the yield by obtaining the distribution (N ($\Delta y_i + y_{0,i,j}$, SE($\Delta y_i$)$^2 + s_i^2$)) of the quality of the product based on the quality ($y_{0,i,j}$) of the M most recently manufactured products, where M is a predetermined number. However, the invention is not limited thereto, and the yield estimator 117 may estimate the yield by obtaining the average value ($y_{0,i}$) of the quality of the product and obtaining the distribution (N ($\Delta y_i + y_{0,i}$, SE ($\Delta y_i$)$^2 + s_i^2$)) of the quality (of a product) that does not depend on a product. Since there is no repeated processing (j=1, . . . , M) for each product (it is assumed that M=1), the manufacturing condition optimization apparatus 100 can perform optimization processing at high speed and can perform optimization processing more frequently.

Modification Example: Quality Inspection Result

In the above-described embodiment, the manufacturing condition optimization apparatus 100 acquires a measured value of the quality as the inspection result (see step S11 in FIG. 6). Instead of the measured value of the quality (quality item, inspection item), an inspection result represented by two values for pass and fail from an external inspection or the like may be obtained or the number of defects in one product may be obtained. In the case of an inspection result represented by two values, the regression model 150 is a logistic regression model, and in the case of the number of defects, the regression model 150 is a Poisson regression model. Both the logistic regression model and the Poisson regression model are included in the generalized linear model.

Other Modification Examples

Although embodiments and modification examples of the invention have been described above, these embodiments are merely examples and do not limit the technical scope of the invention. For example, although the objective function processor 114, quality change amount estimator 115, quality estimator 116, and yield estimator 117 are provided separately in the embodiment for convenience of description, a single functional section, for example a yield estimator, may be used as a yield estimation function. That is, the yield estimator may use the regression model to estimate the yield of the product 470 having a quality that passes the inspection by the inspection equipment 420 when the manufacturing condition of the product 460 manufactured by the manufacturing equipment 410 is changed.

In the above-described embodiment, the distribution (see Expression (3)) of $y_{i,j}$ that is a predicted value of the quality is a normal distribution, but may be a binomial distribution or a Poisson distribution.

The present invention can be in the form of various other embodiments, and furthermore, various changes such as omissions and substitutions can be made thereto without departing from the spirit and scope of the present invention. These embodiments and modifications are included in the scope and the gist of the invention described in this specification and the like, and are included in the invention described in the claims and the scope of equivalents thereof.

REFERENCE SIGNS LIST

100 Manufacturing condition optimization apparatus
110 Controller
111 Learning data generator
112 Regression model generator
113 Optimization processor
114 Objective function processor (yield estimator)
115 Quality change amount estimator (yield estimator)
116 Quality estimator (yield estimator)
117 Yield estimator
140 Learning data
150 Regression model
410 Manufacturing equipment
420 Inspection Equipment
430 Manufacturing management apparatus
440 Manufacturing management data
460 Product

The invention claimed is:

1. A manufacturing condition optimization apparatus comprising:
a hardware processor, wherein
the hardware processor is configured to:
estimate a yield of a product having a quality that passes an inspection by inspection equipment based on a quality of the product at a predetermined time when a manufacturing condition of the product that is manufactured by manufacturing equipment is changed at the predetermined time;
calculate an amount of change in the manufacturing condition at the predetermined time such that the yield of the product is maximized; and
adjust the manufacturing condition based on the amount of change in the manufacturing condition at the predetermined time to maximize the yield of the product.

2. The manufacturing condition optimization apparatus according to claim 1, wherein
the hardware processor is configured to:
estimate an amount of change in a quality of the product that is manufactured by the manufacturing equipment from an amount of change in the manufacturing condition;
estimate a probability that the product passes inspection by the inspection equipment from the amount of change in the quality of the product that is estimated; and estimate the yield of the product having a quality that passes inspection by the inspection equipment from the probability that the product passes inspection.

3. The manufacturing condition optimization apparatus according to claim 2, wherein when the hardware processor estimates the probability that the product passes inspection by the inspection equipment from the amount of change in the quality, the probability that the product passes inspection by the inspection equipment is estimated based on the quality of a predetermined number of products that have been manufactured most recently.

4. The manufacturing condition optimization apparatus according to claim 2, wherein the hardware processor is configured to:

obtain, from an amount of change in the quality of the product, a probability distribution of the quality of said product; and estimate the probability that said product passes inspection by the inspection equipment based on the probability distribution.

5. The manufacturing condition optimization apparatus according to claim 4, wherein the probability distribution is a normal distribution, a binomial distribution, or a Poisson distribution.

6. The manufacturing condition optimization apparatus according to claim 1, wherein the hardware processor is configured to:

generate a regression model for estimating an amount of change in the quality of the product from an amount of change in the manufacturing condition based on data that associates an amount of change in the manufacturing condition of a past and an amount of change in the quality of the product for said amount of change in the manufacturing condition; and estimate an amount of change in the quality of the product from an amount of change in the manufacturing condition using the regression model.

7. The manufacturing condition optimization apparatus according to claim 6, wherein the regression model is a generalized linear model, a Gaussian process regression model, or a neural network model.

8. The manufacturing condition optimization apparatus according to claim 1, wherein the hardware processor is configured to calculate the amount of change in the manufacturing condition at which the yield is maximized by using at least one of an optimization algorithm that does not use a derivative, a local search method, simulated annealing, tabu search, or a genetic algorithm.

9. A computer program product including a non-transitory computer readable storage medium having instructions stored thereon that, when executed by one or more hardware processors, cause the one or more hardware processors to performs operations comprising:

estimating a yield of a product having a quality that passes an inspection by inspection equipment based on a quality of the product at a predetermined time when a manufacturing condition of the product that is manufactured by manufacturing equipment is changed at the predetermined time;

calculating an amount of change in the manufacturing condition at the predetermined time such that the yield of the product is maximized; and adjusting the manufacturing condition based on the amount of change in the manufacturing condition at the predetermined time to maximize the yield of the product.

10. A manufacturing condition optimization method for a manufacturing condition optimization apparatus, the method comprising:

estimating a yield of a product having a quality that passes an inspection by inspection equipment based on a quality of the product at a predetermined time when a manufacturing condition of the product that is manufactured by manufacturing equipment is changed at the predetermined time;

calculating an amount of change in the manufacturing condition at the predetermined time such that the yield of the product is maximized; and adjusting the manufacturing condition based on the amount of change in the manufacturing condition at the predetermined time to maximize the yield of the product.

* * * * *